J. T. PATELIS.
BELL.
APPLICATION FILED NOV. 3, 1919.

1,362,348.

Patented Dec. 14, 1920.
2 SHEETS—SHEET 1.

Witnesses
W. C. Fielding
Augustus B. Copper

Inventor
John T. Patelis
By Joshua R. H. Potts
His Attorney

J. T. PATELIS.
BELL.
APPLICATION FILED NOV. 3, 1919.

1,362,348.

Patented Dec. 14, 1920.
2 SHEETS—SHEET 2.

Witnesses
W. C. Fielding.
Augustus B. Coppes

Inventor
John T. Patelis
By Joshua R. H. Potts
His Attorney

UNITED STATES PATENT OFFICE.

JOHN T. PATELIS, OF PHILADELPHIA, PENNSYLVANIA.

BELL.

1,362,348. Specification of Letters Patent. Patented Dec. 14, 1920.

Application filed November 3, 1919. Serial No. 335,250.

*To all whom it may concern:*

Be it known that I, JOHN T. PATELIS, a subject of the King of the Hellenes, residing at Philadelphia, in the county of Philadelphia and State of Pennsylvania, have invented certain new and useful Improvements in Bells, of which the following is a specification.

One object of my invention is to provide an improved bell, such for example as bells which are adapted to be attached to the necks or sheep or cattle and to so construct my improved bell that it can be quickly and easily manufactured.

Another object is to so construct my improved bell that it can be easily regulated to vary the character of the tone thereof and will be strong and durable.

These objects, and other advantageous ends which will be described hereinafter, I attain in the following manner, reference being had to the accompanying drawings in which—

Figure 1 shows a blank of sheet metal having been partly pressed to provide a recess or concavity and illustrating one stage of an operation which I preferably follow in making my improved bell, Fig. 2 is a section taken on the line 2—2 of Fig. 1, Fig. 3 is a sectional elevation of my improved bell after the same has been formed, Fig. 4 is an enlarged fragmentary section taken on the line 4—4 of Fig. 3.

Figure 1:
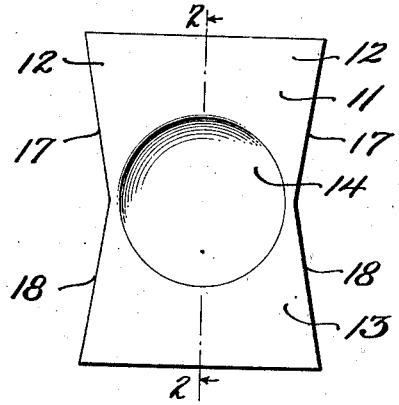
Figure 2:
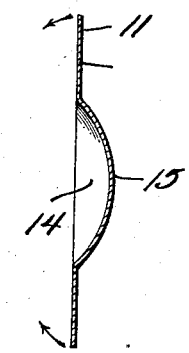
Figure 3:
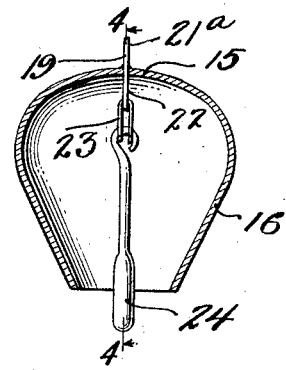
Figure 5:
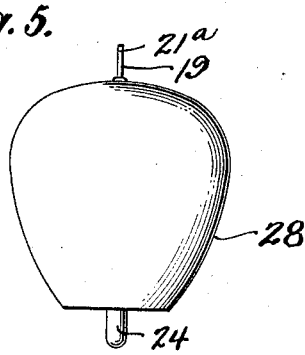
Fig. 5 is an elevation showing a slightly modified form of my improved bell.
Figure 6:
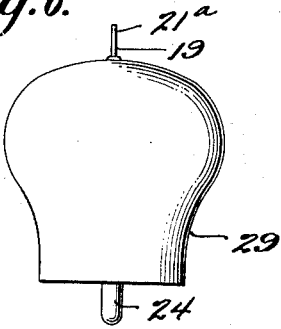
Fig. 6 is a view of similar nature to Fig. 5 showing a still further modification in the shape of my improved bell.

Referring to Figs. 1 to 4 inclusive of the drawings, 11 represents a piece of sheet metal which is cut to provide two oppositely flared portions 12 and 13. This piece of sheet metal is stamped or pressed to provide a recess 14 which provides a curved portion 15 which forms the top of the hollow body portion 16 when the flared portions 12 and 13 are bent downwardly as shown in Fig. 3. The oppositely disposed edges 17 and 18 of the flared portions 12 and 13 are welded together so that the hollow body portion 16 will be seamless.

Figure 4:
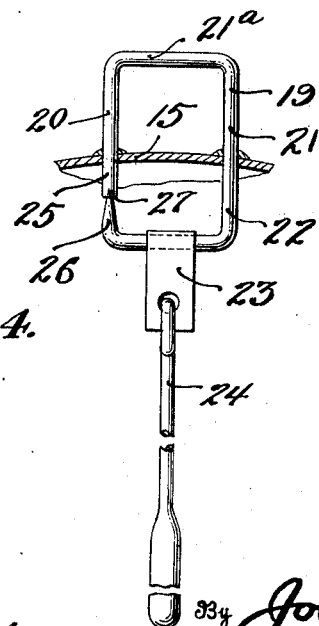
Figure 7:
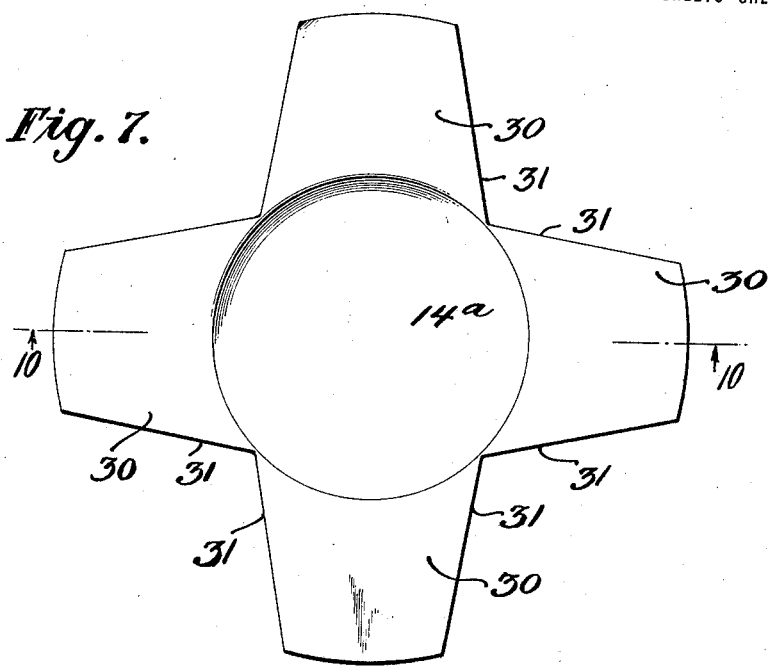
Fig. 7 shows a blank of similar nature to Fig. 1 but including a greater number of extensions.

I insert a link 19 through the top 15 of the hollow body portion 16 and solder or braze opposite parts 20 and 21 of the link 19 to the top 15 of the body portion 16, as clearly shown in Fig. 4. In this manner a loop 21ᵃ is provided on the outside of the body portion 16 for the attachment of a strap or other securing means whereby the bell can be suspended and the part 22 of the link 19 on the inside of the body portion 16 provides means for attachment for a non-metallic loop 23 preferably of leather, raw hide or the like to which the bell clapper or tongue 24 is connected.

The link 19 is made from a single bar of metal and the end portions 25 and 26 are located within the body portion 16. The end 26 is pointed and digs into or pierces the extreme end 27 of the end portion 25. I have found that by varying the degree of contact between the pointed end 26 and the extreme end 27 of the end portion 25 that the vibrations set up in the body portion 16 will vary to such extent that the sound characteristics can be changed merely by varying the degree of pressure between said end portions. This can readily be done by moving the pointed end 26 of the link toward or from the end 27.

The body portion can be made of various shapes such as shown in Figs. 5 and 6 and 7 to 9 inclusive by varying the character of the cut of the sheet metal so that when the edges are brought together and pressed or welded the bottom portion can be varied. For example in Fig. 5 instead of having the bottom part of the body portion tapering straight down, as shown in Fig. 3, the body portion is curved convex as shown at 28, and in Fig. 6 the lower part of the body portion is made concave as shown at 29.

Figure 8:
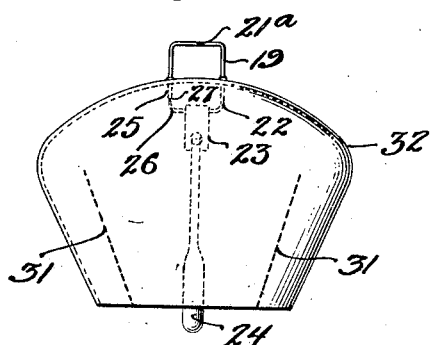
Fig. 8 is an elevation of the bell made from the blank shown in Fig. 7.
Figure 9:
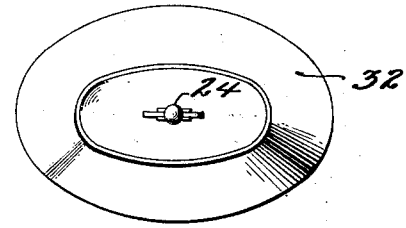
Fig. 9 is an inverted plan view of Fig. 8.
Figure 10:
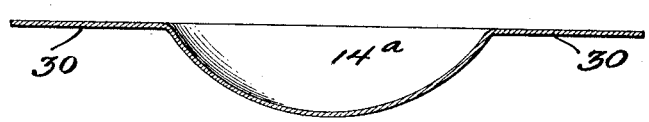
Fig. 10 is a section taken on the line 10—10 of Fig. 7.

In the construction shown in Figs. 7 to 10 inclusive there are four extensions 30 which extend outwardly from the recessed portion 14ᵃ and when the adjacent edges 31 are brought together and welded a seamless body portion 32 will be produced, as clearly shown in Figs. 8 and 9. In all other respects the form shown in Figs. 4 to 5 inclusive is similar to that described in connection with Figs. 1 to 4 and I have therefore given corresponding parts similar reference numerals.

I have found that by initially pressing the recess within the sheet metal that the extensions can be readily bent downwardly either by a press and die or other bending means and the portion can be quickly completed by electro welding or otherwise joining the adjacent edges as above described.

A bell thus formed can be heard from a great distance and as previously stated the character of the tones of the bell can be readily changed merely by varying the pressure between the ends 26 and 25 of the link 19.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A bell including a hollow body portion; a link secured to said body portion and having a portion projecting outside of said body portion to provide a loop; and another portion projecting inside of said body portion to provide attachment for a clapper; substantially as described.

2. A bell including a hollow body portion; a link secured to said body portion and having a looped end part extending into the space within said body portion, said looped part of the link end having free portions in frictional contact with each other, one of said end portions being in the form of a point whereby the end portions can be readily pressed together to cause the pointed end to press the other end to different extents to vary the tone of the body portion; and a clapper secured to said part of the link; substantially as described.

3. A bell including a hollow body portion; a link secured to said body portion and having a looped end part extending into the space within said body portion, said looped part of the link end having free portions in frictional contact with each other, one of said end portions being in the form of a point whereby the end portions can be readily pressed together to cause the pointed end to press the other end to different extents to vary the tone of the body portion; and a clapper secured to said part of the link, said link having another part projecting outside of said body portion providing means of attachment for the bell; substantially as described.

In testimony whereof I have signed my name to this specification in the presence of two subscribing witnesses.

JOHN T. PATELIS.

Witnesses:
SAHUIS P. THEODOUZOORN.
CHAS. E. POTTS.